US010698355B2

(12) United States Patent
Moriguchi (10) Patent No.: US 10,698,355 B2
(45) Date of Patent: Jun. 30, 2020

(54) IMAGE FORMING APPARATUS (71) Applicant: KYOCERA Document Solutions Inc., Osaka (JP)

(72) Inventor: Kohei Moriguchi, Osaka (JP)

(73) Assignee: KYOCERA Documents Solutions Inc., Osaka (JP)

(*) Notice: Subject to any disclaimer, the term of this patent is extended or adjusted under 35 U.S.C. 154(b) by 196 days.

(21) Appl. No.: 16/038,714

(22) Filed: Jul. 18, 2018

(65) Prior Publication Data
US 2019/0025746 A1 Jan. 24, 2019

(30) Foreign Application Priority Data

Jul. 20, 2017 (JP) ................. 2017-141265

(51) Int. Cl.
G03G 15/00 (2006.01)
H04N 1/00 (2006.01)
G03G 15/20 (2006.01)
(52) U.S. Cl.
CPC ..... G03G 15/6502 (2013.01); G03G 15/2017 (2013.01); G03G 15/2064 (2013.01); H04N 1/00668 (2013.01); H04N 2201/0094 (2013.01)

(58) Field of Classification Search
CPC .......... G03G 15/6502; G03G 15/2017; G03G 15/2064; H04N 1/00668; H04N 2201/0094
See application file for complete search history.

(56) References Cited

U.S. PATENT DOCUMENTS

| 5,239,427 A * | 8/1993 | Ooka ................ G11B 15/17 360/71 |
| 2011/0146359 A1* | 6/2011 | Elsner ................ E05B 47/0012 70/63 |
| 2018/0079234 A1* | 3/2018 | Teets .................. G03G 15/6588 |
| 2018/0128022 A1* | 5/2018 | Van Wiemeersch .... E05B 81/76 |

FOREIGN PATENT DOCUMENTS

JP          5-92825          4/1993

* cited by examiner

Primary Examiner — David H Banh
(74) Attorney, Agent, or Firm — Wenderoth, Lind & Ponack, L.L.P.

(57) ABSTRACT

An image forming apparatus includes a hand detection sensor that detects a hand within a predetermined range from a grasping part of a sheet feeding cassette, a locking mechanism capable of locking the sheet feeding cassette in a closed state with respect to the image forming apparatus body, and an operation control unit that operates the locking mechanism to lock the sheet feeding cassette when the hand is detected by the hand detection sensor during the execution of a printing process in an image forming apparatus body, interrupts the printing process after the locking, and releases the locking by the locking mechanism after the interruption.

4 Claims, 10 Drawing Sheets

IMAGE FORMING APPARATUS

CROSS-REFERENCE TO RELATED APPLICATION

This application is based upon and claims the benefit of priority from Japanese Patent Application No. 2017-141265 filed on Jul. 20, 2017, the entire contents of which are incorporated herein by reference.

BACKGROUND

The technology of the present disclosure relates to an image forming apparatus.

In general, an image forming apparatus, such as a copy machine, a printer, a facsimile equipment, and a multifunctional peripheral, includes a sheet feeding cassette capable of receiving bundled sheets. The sheet feeding cassette is movable between a sheet feeding position, at which sheets can be fed to an image forming apparatus body, and a replenishment position at which sheets are drawn out of the image forming apparatus body and can be replenished. When printing is performed, sheets are fed toward the apparatus body one by one from the sheet feeding cassette located at the sheet feeding position.

In this type of image forming apparatus, when printing is performed, if the sheet feeding cassette during sheet feeding is drawn out from the image forming apparatus body, there is a problem that sheet jam may occur. In order to avoid such a problem, an image forming apparatus including a locking device is proposed. The locking device is configured to lock the sheet feeding cassette when a user's hand contacts with a grasping unit of the sheet feeding cassette. Specifically, the locking device includes a detection unit that detects that the hand contacts with the grasping unit of the sheet feeding cassette, an electromagnetic solenoid that is excited when the contact of the hand is detected by the detection unit, and a locking member that is driven by the electromagnetic solenoid to lock the sheet feeding cassette.

SUMMARY

An image forming apparatus according to one aspect of the present disclosure includes an image forming apparatus body, a sheet feeding cassette, a hand detection sensor, a locking mechanism, and an operation control unit. The sheet feeding cassette is configured to be detachable from the image forming apparatus body along a predetermined mounting direction. A grasping part is provided at a front end part of the sheet feeding cassette in the mounting direction. The hand detection sensor detects a hand within a predetermined range from the grasping part. The locking mechanism is configured to be able to lock the sheet feeding cassette in a closed state with respect to the image forming apparatus body. The operation control unit operates the locking mechanism to lock the sheet feeding cassette when the hand is detected by the hand detection sensor during the execution of a printing process in the image forming apparatus body, interrupts the printing process after the locking, and releases the locking by the locking mechanism after the interruption.

DETAILED DESCRIPTION

Hereinafter, embodiments of the present disclosure will be described on the basis of the drawings. It is noted that the technology of the present disclosure is not limited to the following embodiments.

Embodiment 1

Figure 1:
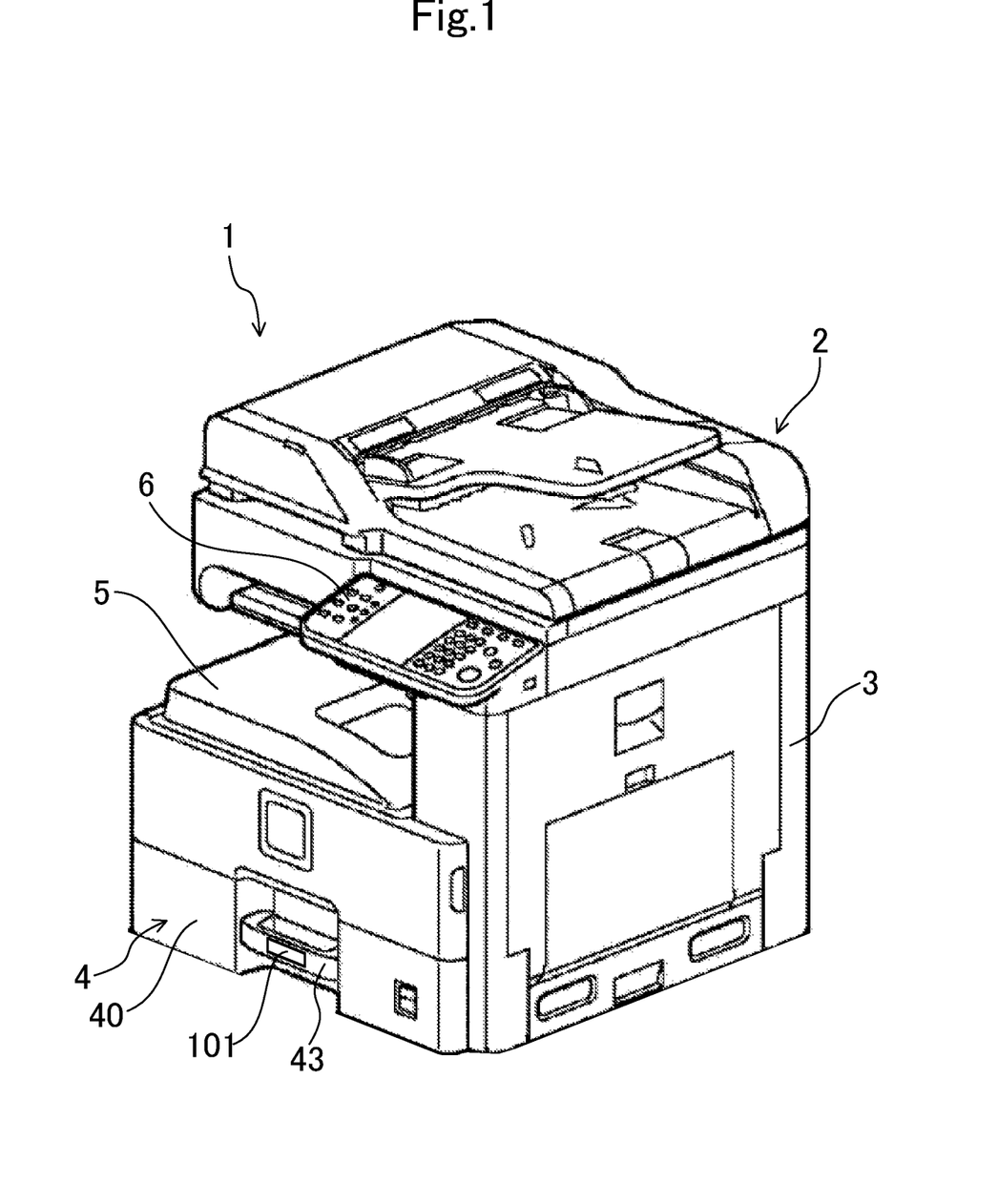
FIG. 1 is an external appearance perspective view illustrating an image forming apparatus in an embodiment.

As illustrated in FIG. 1, an image forming apparatus 1 of the present embodiment, for example, is a multifunctional peripheral, and has an image reading unit 2 that reads a document image, an image forming apparatus body 3 that prints the read document image on a sheet, a sheet feeding unit 4 that feeds the sheet to the image forming apparatus body 3, a sheet discharge unit 5 to which the printed sheet is discharged, and an operation unit 6 for allowing a user to give various instructions to the image forming apparatus body 3.

Figure 2:
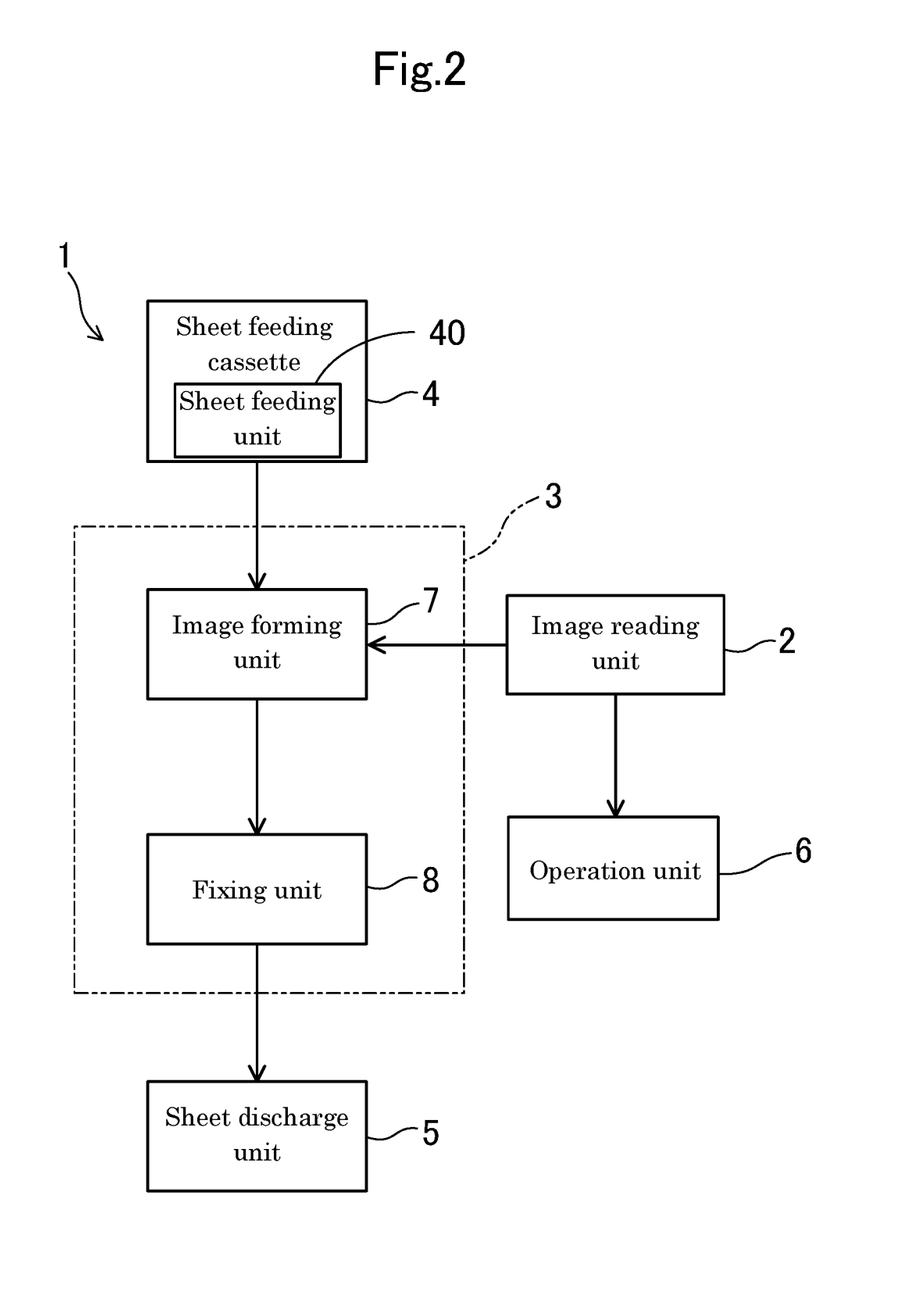
FIG. 2 is a block diagram illustrating a schematic configuration of an embodiment.

The image reading unit 2 is provided above the image forming apparatus body 3 to optically read the document image. As illustrated in FIG. 2, the image forming apparatus body 3 has an image forming unit 7 and a fixing unit 8. Although not illustrated, the image forming unit 7 includes a photosensitive drum, and a charging device, a developing device, a transfer roller and the like which are disposed around the photosensitive drum. The image forming unit 7 transfers a toner image to the sheet supplied from the sheet feeding unit 4 on the basis of image data read by the image reading unit 2 or image data transmitted from an external terminal. The fixing unit 8 includes a fixing roller and a pressure roller (all not illustrated) which rotate in press-contact with each other, and fixes an image (the toner image), which has been transferred to the sheet by the image forming unit 7, to the sheet. The sheet discharge unit 5 receives the sheet with the formed image from the fixing unit 8.

The aforementioned sheet feeding unit 4 has a sheet feeding cassette 40 that receives bundle-like sheets, and a pick-up roller (not illustrated) that takes out the sheets from the sheet feeding cassette 40 one by one and supplies the taken-out sheets to the image forming unit 7. The sheet feeding cassette 40 is detachable from the image forming apparatus body 3 along a predetermined mounting direction (a front and rear direction of the image forming apparatus in the present embodiment). The sheet feeding cassette 40 is mounted in a cassette receiving space provided at a lower end part of the image forming apparatus body 3.

Figure 3:
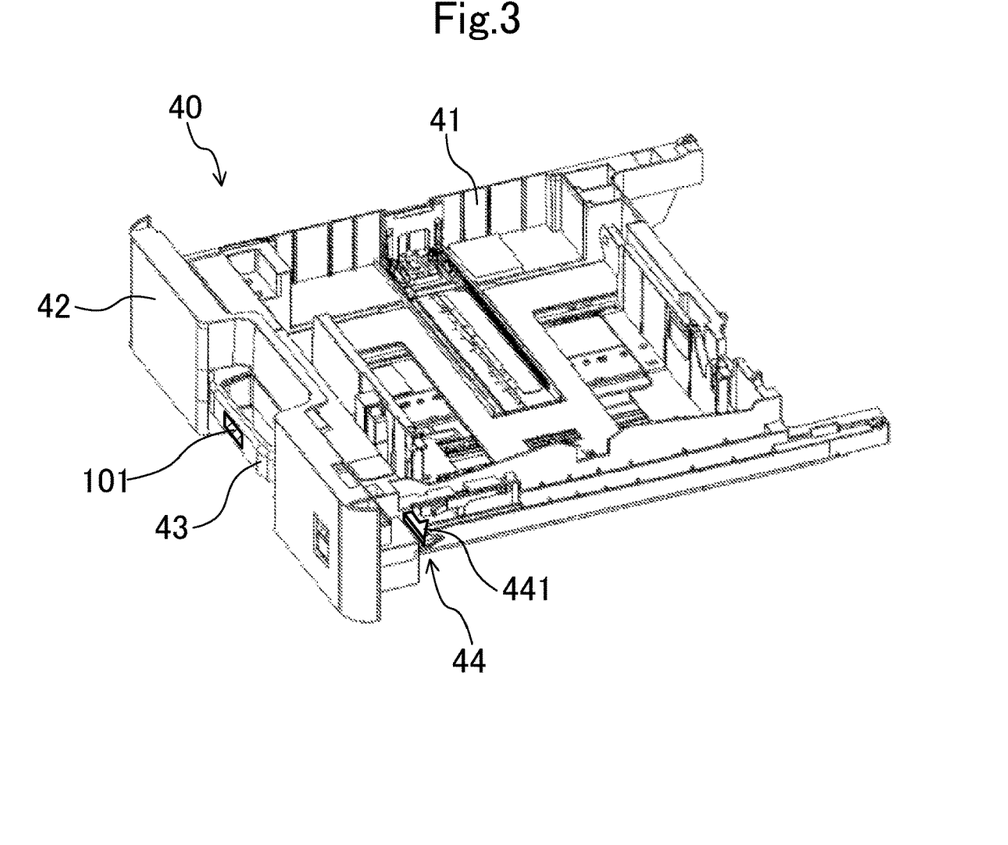
FIG. 3 is a perspective view illustrating a sheet feeding cassette.

As illustrated in FIG. 3, the sheet feeding cassette 40 has a cassette body 41, a front cover part 42, a grasping part 43, and a locking mechanism 44.

The cassette body 41 has a rectangular box shape opened upward and can receive sheets having a predetermined size therein. A front side surface of the cassette body 41 in a cassette mounting direction is fixed to the front cover part 42 having a rectangular plate shape and extending in a sheet width direction. A center part of the front cover part 42 in the sheet width direction is formed with a recess recessed to the cassette body 41 side, wherein the grasping part 43 is provided in the recess.

The grasping part 43 is formed in a channel shape when viewed from an upper side such that a user can grasp the grasping part 43 when the sheet feeding cassette 40 is slid in the mounting direction. The grasping part 43 is provided on the front surface thereof with a hand detection sensor 101. The hand detection sensor 101, for example, is configured by a capacitance sensor. The hand detection sensor 101 detects that a hand approaches around the hand detection sensor 101 and outputs a detection signal to a control unit 100 (corresponding to an operation control unit) to be described later. The detection range of the hand detection sensor 101, for example, is within a range of 2 mm to 5 mm around the hand detection sensor 101.

Figure 4:
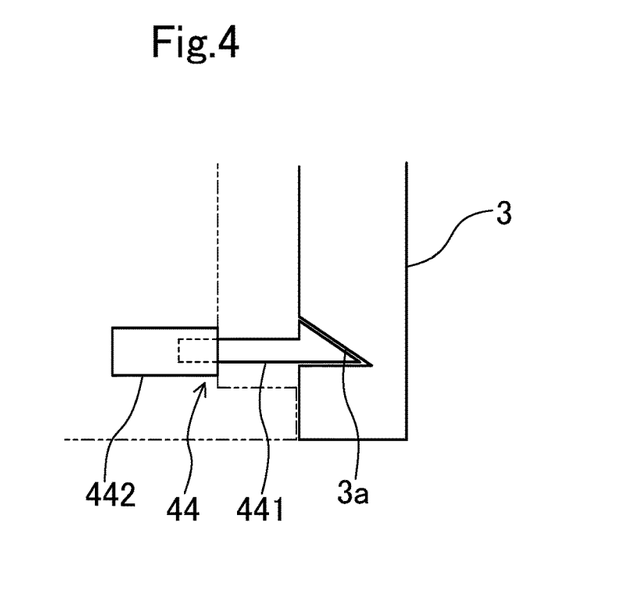
FIG. 4 is an explanation diagram for explaining a configuration of a locking mechanism.

The aforementioned locking mechanism 44 is a mechanism for locking the sheet feeding cassette 40 in a closed state with respect to the image forming apparatus body 3. Specifically, as illustrated in FIG. 4, the locking mechanism 44 has a pair of locking bars 441 (FIG. 4 illustrates only one locking bar 441) protruding from both side surfaces of the cassette body 41 in the sheet width direction, and an electromagnetic solenoid 442 that drives the locking bars 441 so as to freely move back and forth along the protruding direction.

A distal end of the locking bar 441 has a triangular columnar shape in which its distal end is sharply pointed. The electromagnetic solenoid 442 is excited by the control unit 100 to drive the locking bar 441 to the protruding side. When the locking bar 441 is driven to the protruding side, the distal end of the locking bar 441 is engaged with an engaging concave part 3a formed in an inner wall surface of the cassette receiving space of the image forming apparatus body 3. In this way, the slide movement of the sheet feeding cassette 40 in the mounting direction (the front and rear direction) is regulated, so that the sheet feeding cassette 40 is locked. On the other hand, when the excitation of the electromagnetic solenoid 442 is released, the locking bar 441 is moved to an opposite side of the protruding side, so that the engagement between the distal end of the locking bar 441 and the engaging concave part 3a is released. In this way, the locking of the sheet feeding cassette 40 is released and thus the sheet feeding cassette 40 is movable in the mounting direction.

Figure 5:
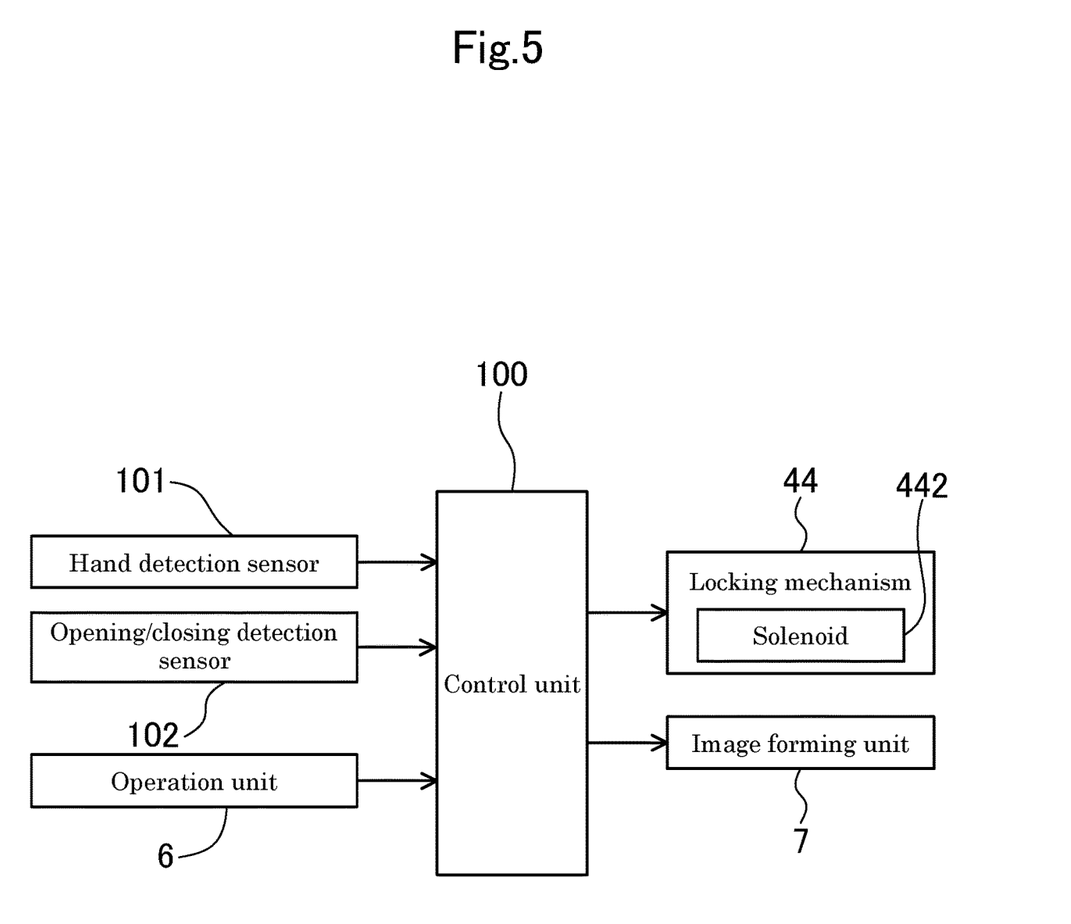
FIG. 5 is a block diagram illustrating a part of a control system in an image forming apparatus.

As illustrated in FIG. 5, the image forming apparatus 1 has the control unit 100 including a CPU, a ROM, a RAM and the like. The control unit 100 performs printing control by the image forming unit 7 and locking control of the sheet feeding cassette 40 by the locking mechanism 44.

The control unit 100 controls the image forming unit 7, the locking mechanism 44 and the like on the basis of signals from the hand detection sensor 101 and an opening/closing detection sensor 102. The opening/closing detection sensor 102 is a sensor provided in the image forming apparatus body 3 to detect an opening/closing state of the sheet feeding cassette 40.

Figure 6:
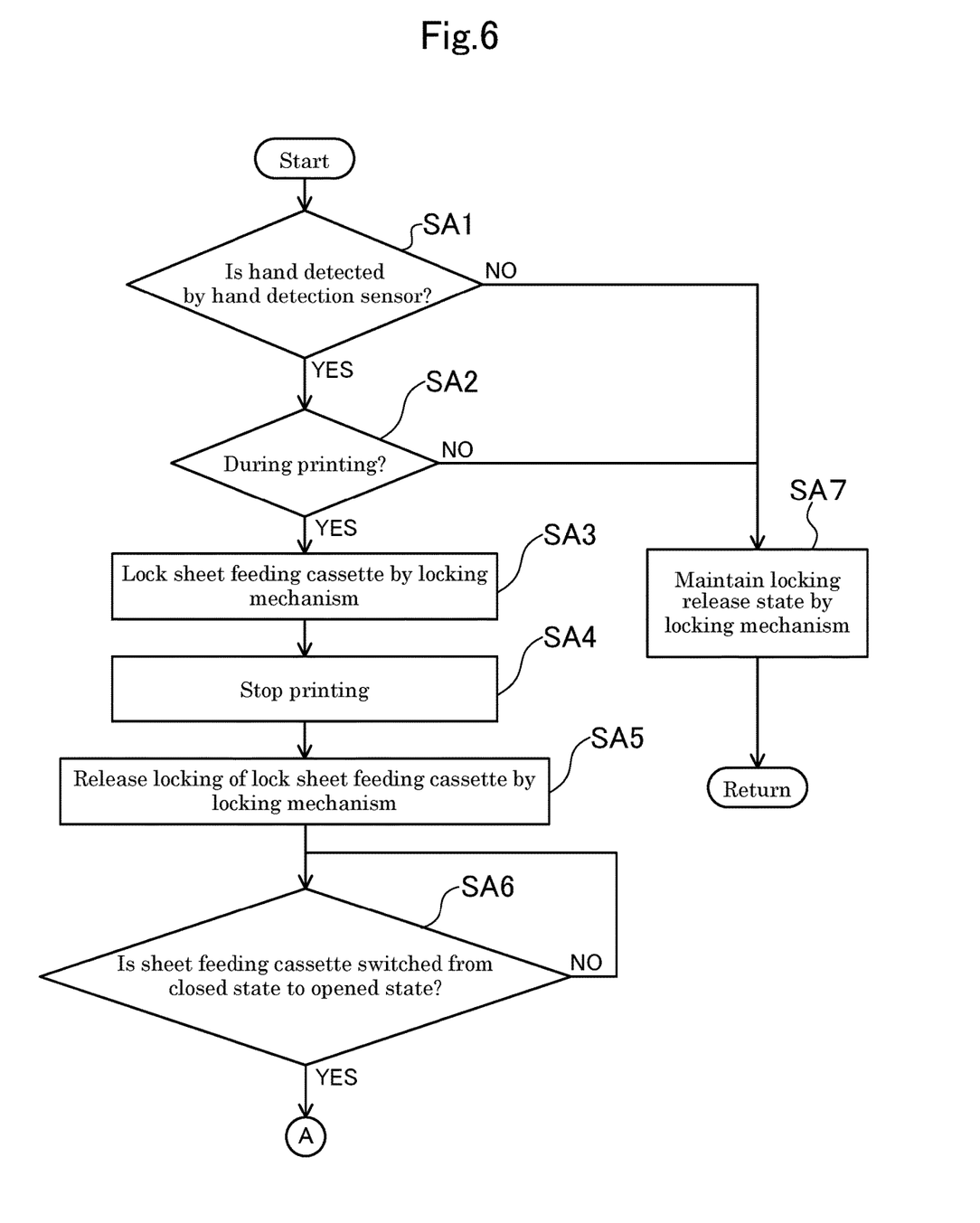
FIG. 6 is a flowchart illustrating a first half of locking control of a sheet feeding cassette in a control unit.
Figure 7:
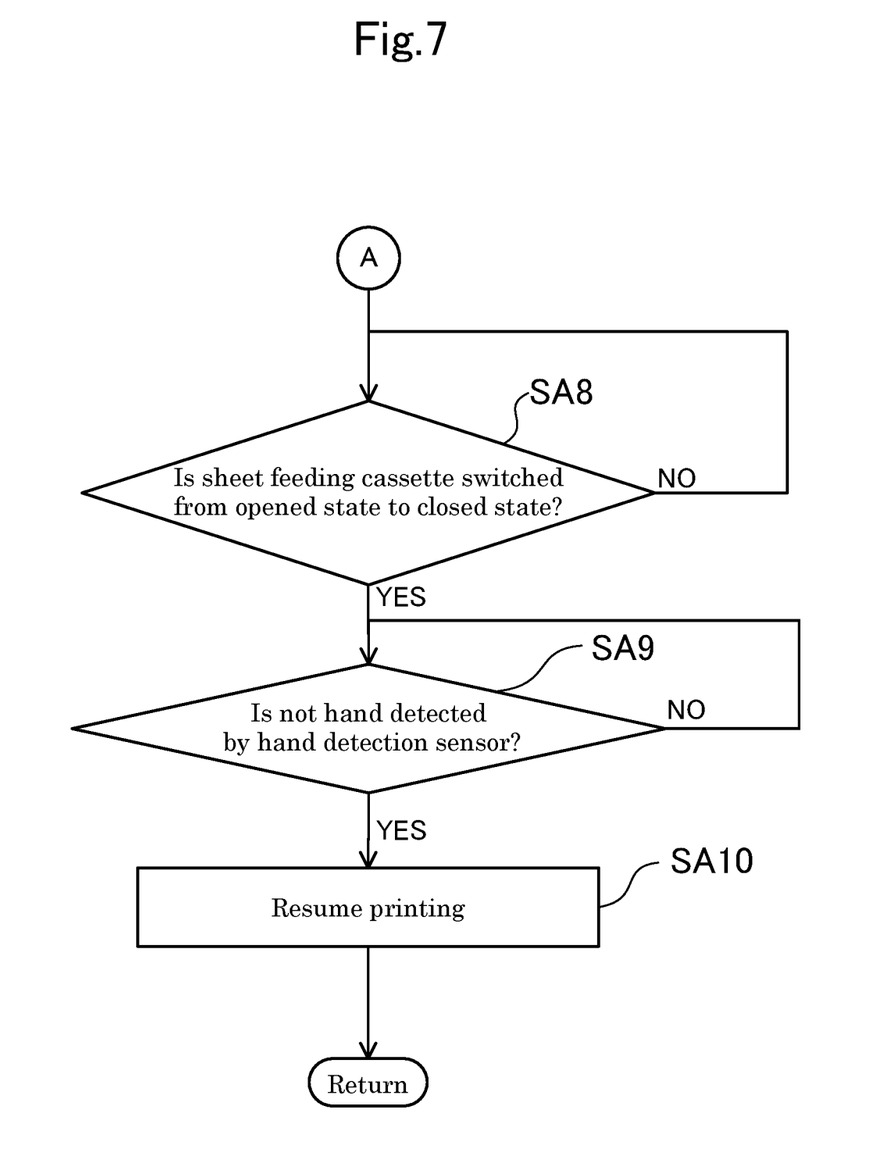
FIG. 7 is a flowchart illustrating a second half of locking control of a sheet feeding cassette in a control unit.

FIG. 6 and FIG. 7 are flowcharts illustrating the content of the locking control of the sheet feeding cassette 40, which is performed by the control unit 100.

In step SA1, the control unit 100 determines whether a user's hand is detected by the hand detection sensor 101. When the determination is NO, the control unit 100 proceeds to step SA7, maintains a locking release state of the sheet feeding cassette 40 by the locking mechanism 44, and then returns. On the other hand, when the determination is YES, the control unit 100 proceeds to step SA2.

In step SA2, the control unit 100 determines whether a printing process is being performed in the image forming apparatus 1. When the determination is NO, the control unit 100 proceeds to step SA7 and then returns. On the other hand, when the determination is YES, the control unit 100 proceeds to step SA3.

In step SA3, the control unit 100 excites the electromagnetic solenoid 442 of the locking mechanism 44 through electrical conduction, thereby locking the sheet feeding cassette 40 by the aforementioned locking bars 441.

In step SA4, the control unit 100 interrupts the printing process being currently performed in the image forming apparatus 1.

In step SA5, the control unit 100 switches the electromagnetic solenoid 442 of the locking mechanism 44 to be in a non-electrical conduction state, thereby releasing the locking of the sheet feeding cassette 40 by the aforementioned locking bars 441.

In step SA6, on the basis of a detection signal from the opening/closing detection sensor 102, the control unit 100 determines whether the sheet feeding cassette 40 is switched from a closed state to an opened state. When the determination is NO, the control unit 100 performs the determination of the present step SA6 again. When the determination is YES, the control unit 100 proceeds to step SA8 (see FIG. 7).

In step SA8, on the basis of a detection signal from the opening/closing detection sensor 102, the control unit 100 determines whether the sheet feeding cassette 40 is switched from an opened state to a closed state. When the determination is NO, the control unit 100 performs the determination of the present step SA8 again. When the determination is YES, the control unit 100 proceeds to step SA9.

In step SA9, the control unit 100 determines whether there is a state (a non-detection state) in which a user's hand is not detected by the hand detection sensor 101. When the determination is NO, the control unit 100 performs the process of the present step SA9 again. When the determination is YES, the control unit 100 proceeds to step SA10.

In step SA10, the control unit 100 resumes the printing process interrupted in step SA4 and then returns.

As described above, the image forming apparatus 1 of the present embodiment includes the image forming apparatus body 3, the sheet feeding cassette 40 detachable from the image forming apparatus body 3 along a predetermined mounting direction and having the grasping part 43 at a front end part in the mounting direction, the hand detection sensor 101 that detects a hand within a predetermined range from the grasping part 43, the locking mechanism 44 capable of locking the sheet feeding cassette 40 in a closed state with respect to the image forming apparatus body 3, and the control unit 100 that operates the locking mechanism 44 to lock the sheet feeding cassette 40 when a hand is detected by the hand detection sensor 101 during the execution of a printing process in the image forming apparatus body 3, interrupts the aforementioned printing process after the locking, and releases the locking by the locking mechanism 44 after the interruption.

According to the configuration, during the execution of the printing process, when a user approaches his/her hand to the grasping part 43 of the sheet feeding cassette 40 in order to replenish the sheet feeding cassette 40 with sheets, the locking mechanism 44 operates, so that the sheet feeding cassette 40 is locked. Consequently, during the printing, the sheet feeding cassette 40 can be prevented from being unnecessarily drawn out, resulting in the prevention of sheet jam.

Furthermore, after the locking mechanism 44 operates, the printing process is interrupted. Immediately after the printing process is interrupted, the locking of the sheet feeding cassette 40 by the locking mechanism 44 is released, so that the locking state of the sheet feeding cassette 40 is prevented from being maintained for a long time, resulting in a prevention of being mistaken for a failure by a user.

When a user manually performs a series of processes of the locking of the sheet feeding cassette 40 firstly, the interruption of the printing process secondary, and then, the locking release of the sheet feeding cassette 40, there are cases where the replenishment timing of sheets to the sheet feeding cassette 40 is delayed and thus the remaining number of sheets in the sheet feeding cassette 40 may be too small. As a consequence, there is a problem that a sheet feeding operation becomes unstable and jam easily occurs. In contrast, in the present embodiment, the series of processes are automatically performed by the control unit 100, so that it is possible to avoid the aforementioned problem.

Furthermore, in the present embodiment, the image forming apparatus 1 further includes the opening/closing detection sensor 102 that detects the opening/closing state of the sheet feeding cassette 40. In addition, after the aforementioned locking of the sheet feeding cassette 40 is released, when the control unit 100 detects that the sheet feeding cassette 40 is switched from a closed state to an opened state and is switched to the closed state again on the basis of a signal from the opening/closing detection sensor 102, the control unit 100 resumes the aforementioned interrupted printing process.

According to the configuration, when a user opens the sheet feeding cassette 40, replenishes the sheet feeding cassette 40 with sheets, and closes the sheet feeding cassette 40, the printing process is automatically resumed. Consequently, the user does not need to perform a manual operation in order to resume printing. Thus, it is possible to reduce user's inconvenience.

Furthermore, the hand detection sensor 101 is configured by a capacitance sensor. Consequently, since it is not always necessary to supply power to the hand detection sensor 101, power consumption is reduced, so that it is possible to improve energy saving.

Embodiment 2

Figure 8:
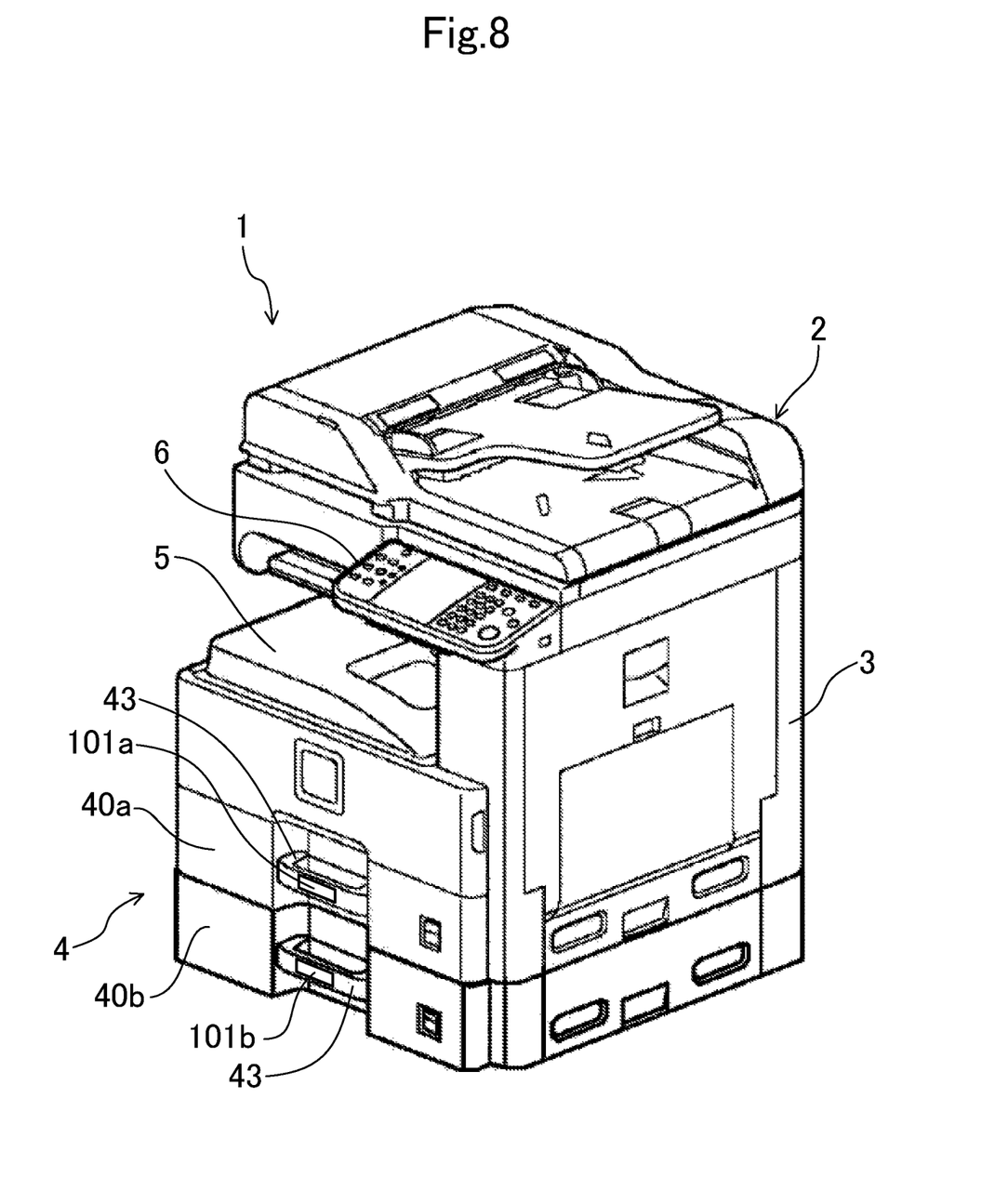
FIG. 8 is a view corresponding to FIG. 1, which illustrates an embodiment 2.
Figure 9:
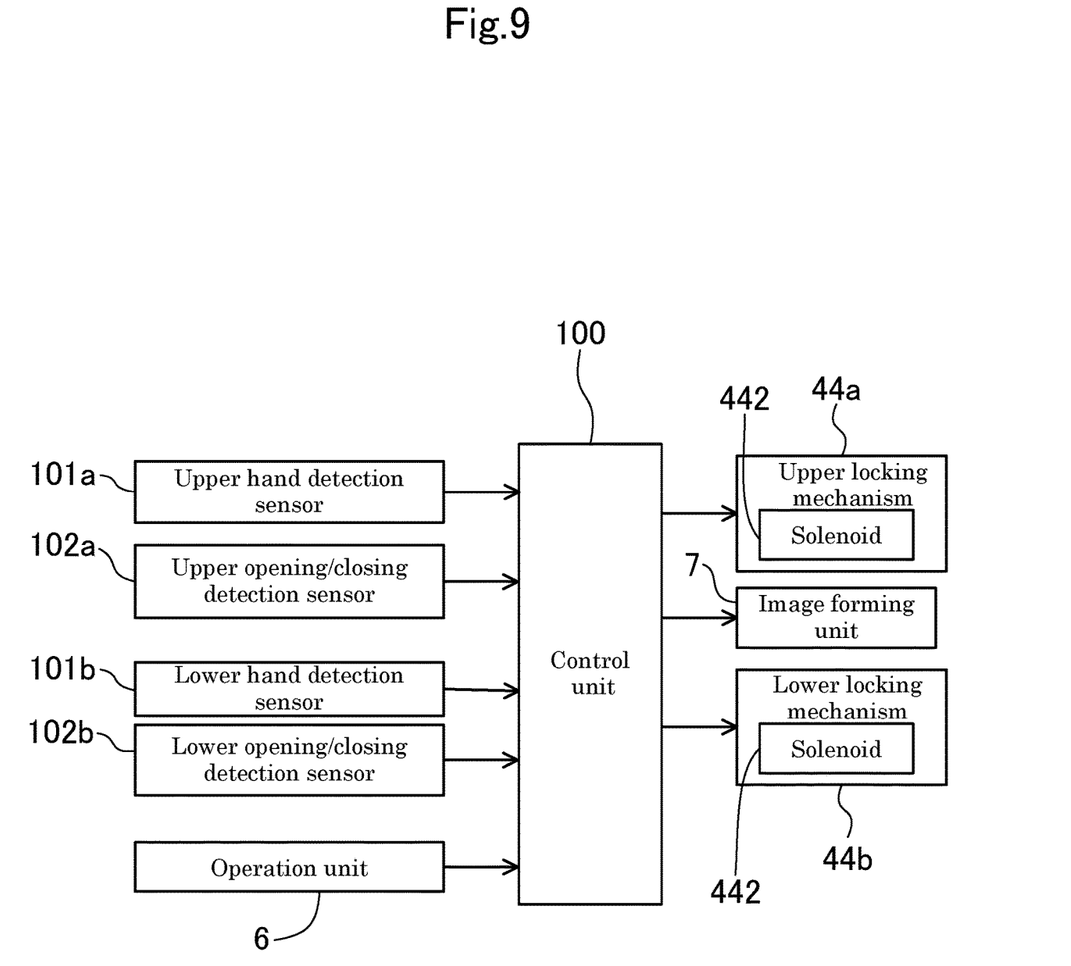
FIG. 9 is a view corresponding to FIG. 5, which illustrates an embodiment 2.

FIG. 8 to FIG. 11 illustrate an embodiment 2. This embodiment is different from the aforementioned embodiment 1 in that two sheet feeding cassettes are provided. In FIG. 8 and FIG. 9, the same reference numerals are used to designate the same elements as those of FIG. 1 and FIG. 5 and a detailed description thereof will be omitted.

That is, in the present embodiment, the sheet feeding unit 4 has an upper sheet feeding cassette 40a and a lower sheet feeding cassette 40b vertically arranged at upper and lower stages. The upper sheet feeding cassette 40a and the lower sheet feeding cassette 40b respectively receive different sizes of sheets. The upper sheet feeding cassette 40a can be locked by an upper locking mechanism 44a (see FIG. 9) and the lower sheet feeding cassette 40b can be locked by a lower locking mechanism 44b. The configuration of each of the locking mechanisms 44a and 44b is the same as that of the locking mechanism 44 described in the embodiment 1.

As illustrated in FIG. 9, the control unit 100 is connected to an upper hand detection sensor 101a, a lower hand detection sensor 101b, an upper opening/closing detection sensor 102a, and a lower opening/closing detection sensor 102b. The upper hand detection sensor 101a and the lower hand detection sensor 101b are respectively mounted at the grasping parts 43 of the upper sheet feeding cassette 40a and the lower sheet feeding cassette 40b. The upper hand detection sensor 101a and the lower hand detection sensor 101b are configured such that mutual detection ranges do not overlap each other. The upper opening/closing detection sensor 102a and the lower opening/closing detection sensor 102b respectively detect opening/closing states of the upper sheet feeding cassette 40a and the lower sheet feeding cassette 40b. The control unit 100 controls locking control of the sheet feeding cassettes 40a and 40b on the basis of signals from these sensors.

Figure 10:
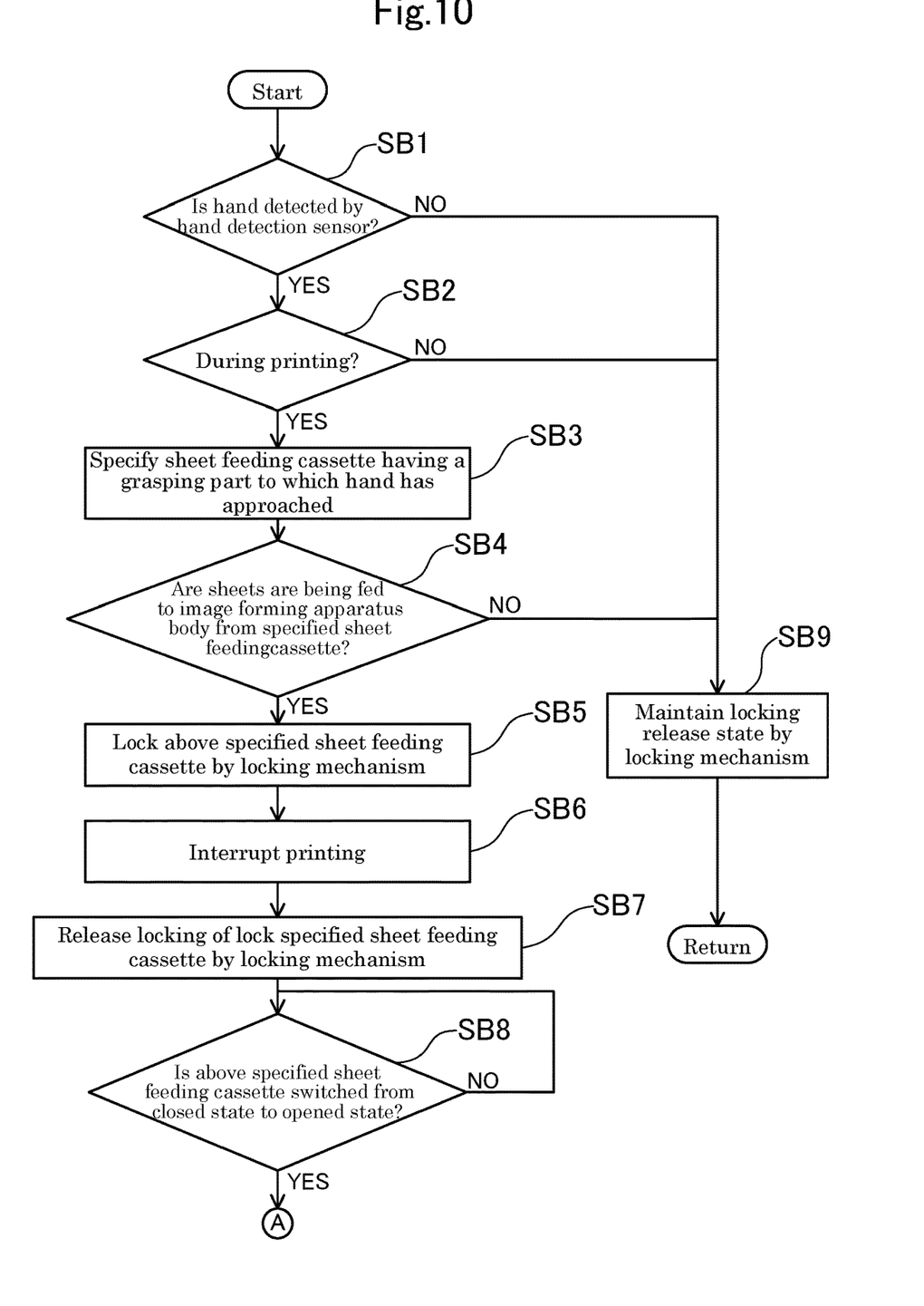
FIG. 10 is view corresponding to FIG. 6, which illustrates an embodiment 2.
Figure 11:
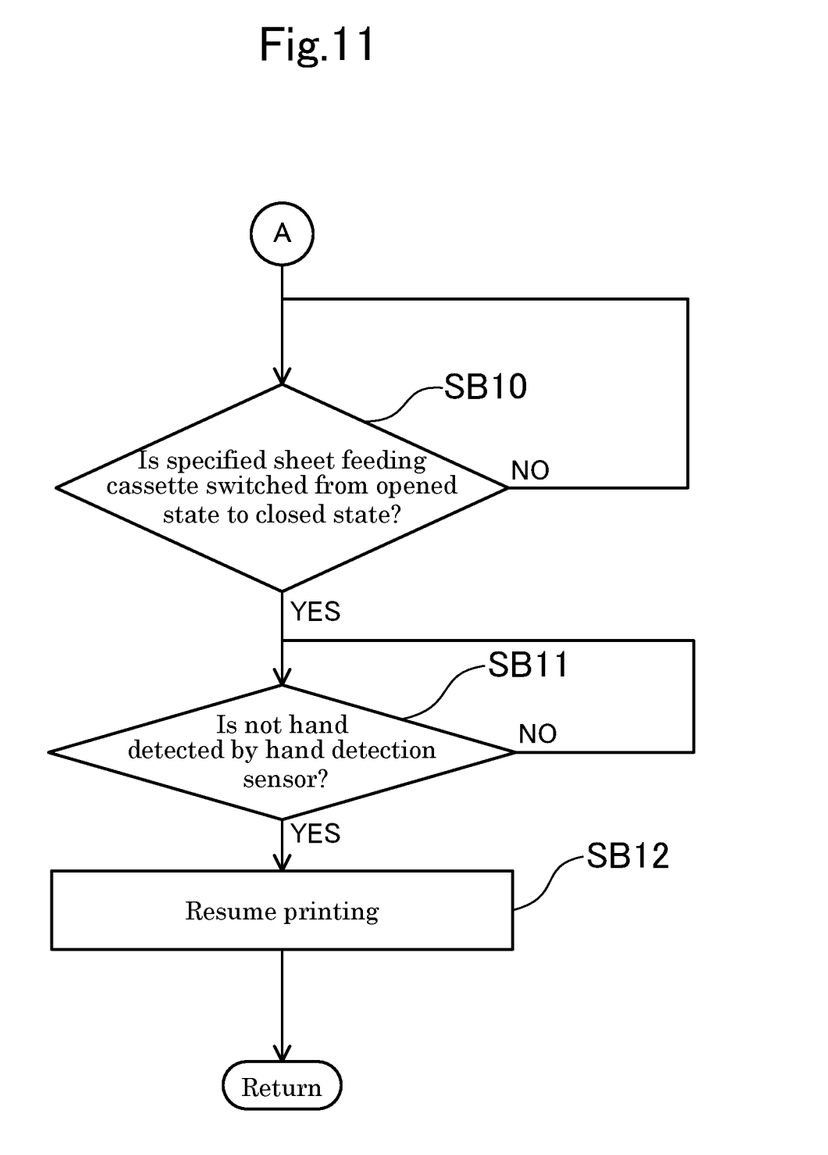
FIG. 11 is a view corresponding to FIG. 7, which illustrates an embodiment 2.

FIG. 10 and FIG. 11 are flowcharts illustrating the content of the locking control which is performed by the control unit 100 of the present embodiment.

In step SB1, the control unit 100 determines whether a user's hand is detected by the upper hand detection sensor 101a or the lower hand detection sensor 101b. When the determination is NO, the control unit 100 proceeds to step SB9, maintains locking release states of the sheet feeding cassettes 40a and 40b by the locking mechanisms 44a and 44b, and then returns. On the other hand, when the determination is YES, the control unit 100 proceeds to step SB2.

In step SB2, the control unit 100 determines whether a printing process is being performed in the image forming apparatus 1. When the determination is NO, the control unit 100 proceeds to step SB9 and then returns. On the other hand, when the determination is YES, the control unit 100 proceeds to step SB3.

In step SB3, the control unit 100 specifies a sheet feeding cassette (a sheet feeding cassette corresponding to the hand detection sensor having detected the hand in step SB1) having a grasping part 43, to which the user's hand has approached, between the upper sheet feeding cassette 40a and the lower sheet feeding cassette 40b.

In step SB4, the control unit 100 determines whether sheets are being fed to the image forming apparatus body 3 from the sheet feeding cassette (the upper sheet feeding cassette 40a or the lower sheet feeding cassette 40b) specified in step SB3. When the determination is NO, the control unit 100 proceeds to the aforementioned step SB9 and then returns. On the other hand, when the determination is YES, the control unit 100 proceeds to step SB5.

In step SB5, the control unit 100 locks the sheet feeding cassette, which has been specified in step SB3, by a locking mechanism (the upper locking mechanism 44a or the lower locking mechanism 44b).

In step SB6, the control unit 100 interrupts the printing process being currently performed in the image forming apparatus 1.

In step SB7, the control unit 100 releases the locking of the sheet feeding cassette, which has been performed in the aforementioned step SB5.

In step SB8, on the basis of detection signals from the upper opening/closing detection sensor 102a and the lower opening/closing detection sensor 102b, the control unit 100 determines whether the sheet feeding cassette specified in step SB3 is switched from a closed state to an opened state. When the determination is NO, the control unit 100 performs the process of the present step SB8 again. When the determination is YES, the control unit 100 proceeds to step SB10 (see FIG. 11).

In step SB10, on the basis of detection signals from the upper opening/closing detection sensor 102a and the lower opening/closing detection sensor 102b, the control unit 100 determines whether the sheet feeding cassette specified in step SB3 is switched from an opened state to a closed state. When the determination is NO, the control unit 100 performs the process of the present step SB10 again. When the determination is YES, the control unit 100 proceeds to step SB11.

In step SB11, the control unit 100 determines whether there is a state (a non-detection state) in which a user's hand is not detected by a hand detection sensor (the upper hand detection sensor 101a or the lower hand detection sensor 101b) mounted at the grasping part 43 of the sheet feeding cassette specified in step SB3. When the determination is NO, the control unit 100 performs the process of the present step SB11 again. When the determination is YES, the control unit 100 proceeds to step SB12.

In step SB12, the control unit 100 resumes the printing process interrupted in step SB6 and then returns.

According to the image forming apparatus 1 of the present embodiment, when a user's hand approaches a grasping part 43 of a sheet feeding cassette (the upper sheet feeding cassette 40a or the lower sheet feeding cassette 40b) during sheet feeding, the sheet feeding unit is locked by a locking mechanism (the upper locking mechanism 44a or the lower locking mechanism 44b), a printing process is interrupted after the locking, and then the locking of the sheet feeding unit by the locking mechanism is released immediately after the interruption. Consequently, it is possible to obtain operation and effect similar to those of the embodiment 1.

On the other hand, even though a hand approaches a grasping part 43 of a sheet feeding cassette (the upper sheet feeding cassette 40a or the lower sheet feeding cassette 40b) which is not feeding sheets to the image forming unit 7, since the locking mechanisms 44a and 44b do not operate, the sheet feeding cassette can be prevented from being unnecessarily locked, resulting in the prevention of inhibition of sheet replenishment work.

Another Embodiment

In the aforementioned each embodiment, an example, in which the image forming apparatus is a copy machine, has been described; however, the technology of the present disclosure is not limited thereto and the image forming apparatus 1 may include a printer, a facsimile, a multifunctional peripheral (MFP) and the like.

What is claimed is:

1. An image forming apparatus comprising:
an image forming apparatus body;
a sheet feeding cassette detachable from the image forming apparatus body along a predetermined mounting direction and having a grasping part at a front end part in the mounting direction;
a hand detection sensor that detects a hand within a predetermined range from the grasping part;
a locking mechanism that is able to lock the sheet feeding cassette in a closed state with respect to the image forming apparatus body; and
an operation control unit that operates the locking mechanism to lock the sheet feeding cassette when the hand is detected by the hand detection sensor during an execution of a printing process in the image forming apparatus body, interrupts the printing process after the locking, and releases the locking by the locking mechanism after the interruption.

2. The image forming apparatus of claim 1, further comprising:
an opening/closing detection sensor that detects an opening/closing state of the sheet feeding cassette,
wherein, after the locking of the sheet feeding cassette is released, when the operation control unit determines that the sheet feeding cassette is switched from a closed state to an opened state and is switched to the closed state again on the basis of a signal from the opening/closing detection sensor, the operation control unit resumes the interrupted printing process.

3. The image forming apparatus of claim 1, wherein the sheet feeding cassette is provided in a plural number,
the locking mechanism and the hand detection sensor are separately provided to each of the plurality of sheet feeding cassettes, and
in a case where a hand is detected by one hand detection sensor of the plurality of hand detection sensors during a printing process in the image forming apparatus body, the operation control unit determines whether a sheet feeding cassette corresponding to the one hand detection sensor is feeding sheets to the image forming apparatus body, and performs processes of operating a locking mechanism corresponding to the sheet feeding cassette to lock the sheet feeding cassette, interrupting the printing process after the locking, and releasing the locking by the locking mechanism after the interruption when it is determined that the one hand detection sensor is under the sheet feeding while maintaining the sheet feeding cassette in a locking release state without performing the processes when it is determined that the one hand detection sensor is not during the sheet feeding.

4. The image forming apparatus of claim 1, wherein the hand detection sensor is configured by a capacitance sensor.

* * * * *